(12) United States Patent
Ramme et al.

(10) Patent No.: US 8,520,210 B2
(45) Date of Patent: Aug. 27, 2013

(54) SEPARATION OF CENOSPHERES FROM FLY ASH

(75) Inventors: Bruce W. Ramme, Okauchee, WI (US); John J. Noegel, Port Washington, WI (US); Pradeep K. Rohatgi, Whitefish Bay, WI (US)

(73) Assignee: Wisconsin Electric Power Company, Milwaukee, WI (US)

( * ) Notice: Subject to any disclaimer, the term of this patent is extended or adjusted under 35 U.S.C. 154(b) by 0 days.

(21) Appl. No.: 13/290,725

(22) Filed: Nov. 7, 2011

(65) Prior Publication Data
US 2012/0050519 A1  Mar. 1, 2012

Related U.S. Application Data

(62) Division of application No. 12/028,899, filed on Feb. 11, 2008, now Pat. No. 8,074,804.

(60) Provisional application No. 60/889,840, filed on Feb. 14, 2007.

(51) Int. Cl.
*G01N 21/00* (2006.01)
*H04N 7/18* (2006.01)
*B07B 4/00* (2006.01)

(52) U.S. Cl.
USPC ............. 356/432; 356/341; 209/133; 438/79

(58) Field of Classification Search
USPC ................ 356/432–444, 335–339; 359/296; 427/428, 434.3; 525/242; 526/346; 209/133, 209/10, 17, 39; 264/43, 54, 628
See application file for complete search history.

(56) References Cited

U.S. PATENT DOCUMENTS

| | | | |
|---|---|---|---|
| 3,344,918 A * | 10/1967 | Leonard, III | 209/17 |
| 3,533,819 A | 10/1970 | Pennachetti | |
| 3,865,611 A * | 2/1975 | Sato et al. | 430/103 |
| 3,997,435 A | 12/1976 | Farnum et al. | |
| 4,121,945 A | 10/1978 | Hurst et al. | |
| 4,652,433 A | 3/1987 | Ashworth et al. | |
| 4,961,843 A | 10/1990 | Lewis | |
| 5,227,047 A | 7/1993 | Hwang | |
| 5,456,363 A | 10/1995 | Groppo et al. | |
| 5,817,230 A | 10/1998 | Groppo et al. | |
| 5,992,336 A | 11/1999 | Ramme | |
| 6,043,067 A * | 3/2000 | Lihme et al. | 435/174 |
| 6,068,131 A | 5/2000 | Styron et al. | |
| 6,239,224 B1 * | 5/2001 | Mørk et al. | 525/242 |
| 6,269,952 B1 | 8/2001 | Watt et al. | |
| 6,533,848 B1 | 3/2003 | Robl et al. | |
| 6,540,088 B2 | 4/2003 | Oder et al. | |
| 6,637,354 B2 | 10/2003 | Ramme | |
| 6,666,335 B1 | 12/2003 | Bradley et al. | |
| 7,455,798 B2 * | 11/2008 | Datta et al. | 264/43 |
| 7,741,574 B2 | 6/2010 | Stencel et al. | |
| 2001/0006706 A1 * | 7/2001 | Picard | 427/428 |
| 2004/0179197 A1 * | 9/2004 | Peterson et al. | 356/338 |
| 2005/0281973 A1 * | 12/2005 | Park | 428/36.92 |
| 2006/0146394 A1 * | 7/2006 | Kaga et al. | 359/296 |
| 2008/0190327 A1 | 8/2008 | Ramme et al. | |

OTHER PUBLICATIONS

American Society for Testing and Materials, "Standard Specification for Fly Ash and Raw or Calcined Natural Pozzolan for Use as a Mineral Admixture in Portland Cement Concrete", Designation: C 618-99, Jul. 1999.

\* cited by examiner

*Primary Examiner* — Sang Nguyen
(74) *Attorney, Agent, or Firm* — Quarles & Brady LLP

(57) ABSTRACT

Methods for increasing the amount of cenospheres in a fly ash sample are disclosed. The cenospheres are obtained in a dry state by using air as the "fluid" media for separation. In one version, the invention is a two step process, that is, screen by size followed by density separation such as in a fluidizing vertical column by density. In another version of the invention, the separation by density is followed by screening by size. Additional cycles can improve purity as defined by concentration of cenospheres.

11 Claims, 3 Drawing Sheets

RESULTS OF SCREENING OF PPPP FLY ASH AND CENOSPHERES IN DIFFERENT SIZE FRACTIONS

The numbers in parentheses are estimates of volume percent cenospheres in the different size fractions, as determined by Transmission Optical Microscopy PPPP Fly Ash (10%)
- Oversize 400 Mesh (20%)
  - Unwashed
  - Washed:
    - Pan (>1%)
    - 635 Mesh (2 - 3%)
    - 500 Mesh (5%)
    - 400 Mesh (10 - 20%)
    - 325 Mesh (10 - 20%)
    - 270 Mesh (5 - 10%)
    - 230 Mesh (3 - 5%)
    - 200 Mesh (3 - 5%)
    - 170 Mesh (3 - 5%)
    - 140 Mesh (1 - 2%)
    - 120 Mesh (2 - 3%)
- Undersize 400 Mesh (2 - 3%)
  - Washed:
    - Pan (30 - 40%)
    - 625 Mesh (30 - 40%)
    - 230 Mesh (30 - 40%)
    - 200 Mesh (10 - 20%)
    - 170 Mesh (5 - 10%)

FIGURE 1

RESULTS OF FLUIDIZED BED CLASSIFICATION OF THE OVERSIZED +400 MESH PPPP FLY ASH AND CENOSPHERES IN THREE CLASSIFICATION EXPERIMENTS

The numbers in parentheses are estimates of percent cenospheres: by volume with density up to 3.0 g/cc as determined by Transmission Optical Microscopy, and by weight as determined by water centrifuge.

PPPP Fly Ash
(10% by volume; 0.6% by weight)

Classification Test #1
Air Velocity 38 – 50 sfpm
- Bed – 94.3% of ash (5% by volume)
- Carryover – 5.7% of ash (40% by volume; 5.44% by weight)

Classification Test #2
Air Velocity 80 sfpm
- Bed – 81% of ash (5% by volume)
- Carryover – 19% of ash (40% by volume; 4.5% by weight)

Classification Test #3
Air Velocity 100 sfpm
- Bed – 36% of ash (1.2% by volume)
- Carryover – 64% of ash (15% by volume, Weight = NA)

FIGURE 2

Weight percentage recovery of cenospheres during direct centrifuging as collected fly ash in water, and centrifuging after screening through +400 mesh screen and fluidized bed separation.

SEPARATION OF CENOSPHERES FROM FLY ASH

CROSS-REFERENCES TO RELATED APPLICATIONS

This application is a divisional application of U.S. patent application Ser. No. 12/028,899 filed Feb. 11, 2008 now U.S. Pat. No. 8,074,804, which claims priority from U.S. Provisional Patent Application No. 60/889,840 filed Feb. 14, 2007.

STATEMENT REGARDING FEDERALLY SPONSORED RESEARCH

Not Applicable.

BACKGROUND OF THE INVENTION

1. Field of the Invention

This invention relates to a method for increasing the amount of cenospheres in a fly ash sample.

2. Description of the Related Art

Coal fired boilers are widely used to generate steam for producing electricity. A common form of boiler uses a pulverized coal that is injected into a furnace. The process of burning coal in a boiler produces fly ash. Some of the recovered fly ash is commercially usable in concrete, concrete products, cement production, sewage sludge stabilization, pavement base materials, lightweight aggregate, reinforced plastics, and other miscellaneous purposes. The remaining fly ash must generally be disposed of by landfilling since it has no commercial value. It is well known that landfill space is rapidly dwindling in many regions and that the construction of new landfills is very costly. Therefore, much effort has been directed at finding uses for fly ash so that the fly ash does not need to be landfilled.

The composition of fly ash can vary depending on the composition of coal that generated the fly ash. Therefore, material specifications have been developed for fly ash that is to be used in specific applications. For example, fly ash that is used as a filler in concrete should meet the specifications described in American Society for Testing and Materials, "Standard Specification for Fly Ash and Raw or Calcined Natural Pozzolan for Use as a Mineral Admixture in Portland Cement Concrete", Designation: C 618. This ASTM specification indicates that fly ash particles are made largely of silicon dioxide, aluminum oxide and iron oxide. The particles in fly ash have different types of structures. Some particles in fly ash are solid. Other particles in fly ash are hollow and are called cenospheres. A cenosphere is a lightweight, inert, hollow sphere filled with inert air or gas. Cenospheres are hard and rigid, light, waterproof and insulative. Due to the hollow structure, cenospheres have lower density (e.g., some cenospheres have a density below 1 g/cc) as compared to solid fly ash particles. Cenospheres have traditionally been reported to represent about 1-3% by weight of the total fly ash produced.

In the composite materials field, there is increasing interest in ultra light energy-absorbing materials and structures which incorporate hollow particles. Accordingly, cenospheres have been added to polymers and there is growing interest in incorporating them in metals. Fine and sized cenospheres can be sold at attractive prices to this segment of industry providing syntactic foams and cellular solids. In addition, there is a growing market for fine solid microspheres to produce reinforced polymers, metals and ceramics.

Methods are known for recovering cenospheres from fly ash. In one method, cenospheres lighter than water are skimmed off of ash ponds (as many cenospheres float due to their lower density), dried and sold for use. U.S. Pat. No. 4,652,433 describes another method in which fly ash is screened into a coarse fraction and a fine fraction, and cenospheres are removed from the coarse fraction by mixing the coarse fraction with water such that the cenospheres float on the water and are removed by skimming. However, these processes do have disadvantages. For example, these methods only collect cenospheres with a density of less than 1.0 g/cc as only cenospheres of these densities float on water. Also, the fly ash that is produced from burning subbituminous western coal includes significant amounts of calcium compounds. For example, this fly ash may include 10% or more lime. These high calcium fly ashes (such as ASTM C 618 Class C fly ash) have cementitious properties and therefore, when mixed with water these fly ashes rapidly harden and the remainder cannot then be used for other purposes such as a cementitious material in the production of concrete. In the case of Class F fly ash, a dry method also provides the advantage of not expending energy to dry the remainder after separation of cenospheres for other uses. Another disadvantage is that, many cenospheres are entrapped in agglomerated and/or hardened masses before flotation occurs. Furthermore, the known methods for recovering cenospheres from fly ash do not allow for recovery of cenospheres of controlled sizes and densities. As a result, the properties of polymeric composites including cenospheres have not been optimized due to lack of availability of cenospheres of controlled sizes and densities.

Thus, there is a need for a method for recovering cenospheres from fly ash that has cementitious properties. There is also a need for a method for recovering cenospheres of narrow size ranges and densities from fly ash.

SUMMARY OF THE INVENTION

The need for an improved method for recovering cenospheres from fly ash is met by a method according to the invention. In the method, the weight or volume percentage of cenospheres in a fly ash sample is increased preferably providing a material of greater than 90% cenospheres.

In one aspect, the method includes the step of separating an amount of fly ash having an initial weight or volume percentage of cenospheres into a first fraction having particle sizes greater than a first particle size and a second fraction having particle sizes less than or equal to a second particle size smaller than the first particle size. Preferably, in this step, the fly ash is separated into the first fraction and the second fraction by dry screening of the fly ash. This is advantageous as it avoids any agglomeration of fly ash having calcium compounds such as the cementitious fly ash that is a byproduct of burning subbituminous or lignite coal.

The first fraction (which has fly ash of larger particle sizes) and/or the second fraction (which has fly ash of smaller particle sizes) is then separated into a third fraction having particle densities greater than a predetermined particle density and a fourth fraction having particle densities less than the predetermined particle density. Because cenospheres have a lower density than solid (non-hollow) particles, the resulting fourth fraction has a percentage of cenospheres greater than the initial percentage in the fly ash. The first fraction or the second fraction may be separated by density using fluidization or air classification, preferably in the absence of water. A fluidized column of air is suitable for separation by fluidization. The first fraction would be separated when it is desired to obtain larger particle size cenospheres, and the second fraction would be separated when it is desired to obtain smaller particle size cenospheres. Optionally, the fourth fraction may be separated by screening into a fifth fraction having larger particle sizes and a sixth fraction having smaller particle sizes. Further separation by screening is also possible.

In another aspect, the method includes the steps of separating an amount of fly ash into a first fraction of fly ash having particle densities greater than a predetermined particle density and a second fraction of fly ash having particle densities less than or equal to the predetermined particle density; and separating the first fraction of fly ash or the second fraction of fly ash into a third fraction of fly ash having particle sizes less than or equal to a predetermined particle size and a fourth fraction of fly ash having particle sizes greater than the predetermined particle size such that the fourth fraction of fly ash has a percentage of cenospheres greater than the initial percentage in the fly ash sample.

Thus, it is an advantage of the present invention to provide a method for increasing the amount of cenospheres in a fly ash sample.

It is another advantage to provide a method for increasing the amount of cenospheres in a fly ash sample having cementitious (e.g., calcium) compounds.

It is yet another advantage to provide a method for increasing the amount of cenospheres in a fly ash sample wherein the method can be undertaken in the absence of water.

It is still another advantage to provide a method for increasing the amount of cenospheres in a fly ash sample wherein the method classifies cenospheres into different particle size ranges.

These and other features, aspects, and advantages of the present invention will become better understood upon consideration of the following detailed description and appended claims.

BRIEF DESCRIPTION OF THE DRAWINGS

FIG. 1 is a flow chart showing the volume percentage of cenospheres recovered from the Class C fly ash used in the examples herein (PPPP fly ash) after screening.

FIG. 2 is a flow chart showing the volume and weight percentage of cenospheres recovered from the Class C fly ash used in the examples herein (PPPP fly ash) after fluidized bed separation.

DETAILED DESCRIPTION OF THE INVENTION

Figure 3:
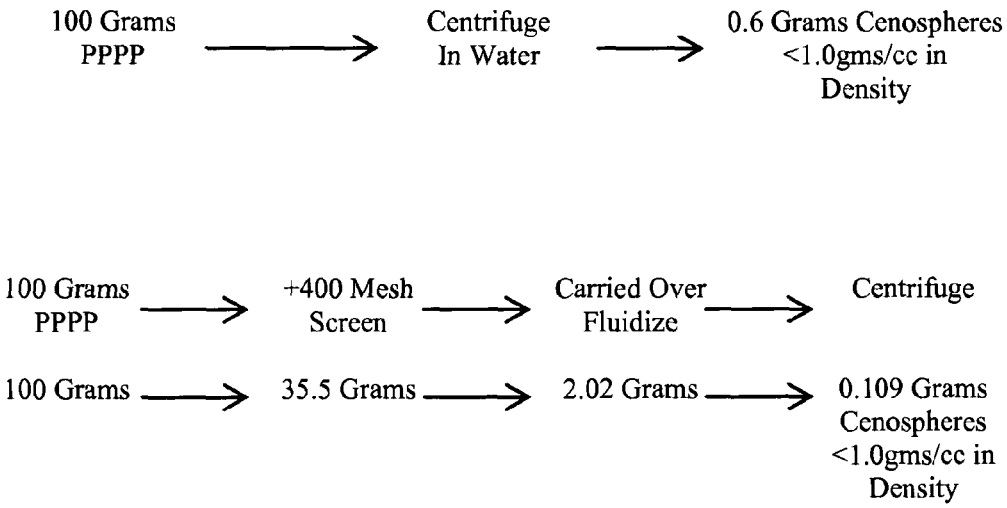
FIG. 3 is a flow chart showing the weight percentage of cenospheres recovered from the Class C fly ash used in the examples herein (PPPP fly ash) after direct centrifuging, and centrifuging after screening through +400 mesh screen and fluidized bed separation.

The present invention provides methods for increasing the amount of cenospheres in a fly ash sample. In one aspect of the invention, fly ash is separated into narrow particle size fractions, followed by air classification or fluidized bed density separation, and then an optional further particle size separation may be performed to separate cenospheres. The advantage of screening fly ash in narrow size fractions and then doing density separation using processes like fluidized bed is that it can yield both solid and hollow fly ash particles separated in different size ranges. Both solid and hollow fly ash particles, separated in different size fractions, especially the ultra fine size fractions, can yield better properties in composites and higher prices in the market.

In this version of the method of the invention, the amount of cenospheres in a fly ash sample, as measured by a volume percentage or a weight percentage, is increased. First, an amount of fly ash having an initial percentage of cenospheres is separated into a first fraction of fly ash having particle sizes greater than a predetermined particle size and a second fraction of fly ash having particle sizes less than or equal to the predetermined particle size. Second, the first fraction of fly ash and/or the second fraction of fly ash is separated into a third fraction of fly ash having particle densities greater than a predetermined particle density and a fourth fraction of fly ash having particle densities less than or equal to the predetermined particle density such that the fourth fraction of fly ash has a percentage of cenospheres greater than the initial percentage. In an example version of the method, the initial percentage of cenospheres in the fly ash sample can be about 1% to about 10%, as measured by a volume percentage or a weight percentage, and the percentage of cenospheres in the fourth fraction of fly ash is at least 40%, preferably at least 70%, more preferably at least 90%, and most preferably at least 95%.

The fly ash can be a byproduct of burning bituminous coal and/or subbituminous coal. In an example version of the method, the fly ash can be a byproduct of burning (i) subbituminous coal and (ii) fly ash recovered from a previous burning of coal. The fly ash can include lime at a level of about 10% or more lime. The fly ash can be ASTM C 618 Class C fly ash. The fly ash can be cementitious.

In the fourth fraction of fly ash that is separated by density from either the first fraction of fly ash (having larger particle sizes) or the second fraction of fly ash (having smaller particle sizes), at least some of the cenospheres can have a density less than or equal to 1 g/cc. Also, at least some of the cenospheres in the fourth fraction of fly ash can have a density greater than 1 g/cc. Also, at least some of the cenospheres in the fourth fraction of fly ash have a density greater than 2 g/cc.

The initial fly ash sample can be separated into a first fraction of fly ash (having larger particle sizes) and the second fraction of fly ash (having smaller particle sizes) by dry screening. The amount of fly ash may be screened more than one time to produce the first fraction and the second fraction. The amount of fly ash can be screened a first time with a first screen and a subsequent time with a second screen of a different material. The initial fly ash sample can be separated into a first fraction of fly ash (having larger particle sizes) and the second fraction of fly ash (having smaller particle sizes) in the absence of water to avoid agglomeration of cementitious particles. The initial fly ash sample can be separated into a first fraction of fly ash (having larger particle sizes) and the second fraction of fly ash (having smaller particle sizes) using various predetermined particle sizes as the break point between the first fraction of fly ash and the second fraction of fly ash. For example, the predetermined particle size may be any size up to 200 microns. In one version of the invention, the predetermined particle size is in the range of 21 to 126 microns. One example predetermined particle size is 38 microns.

The first fraction of fly ash and/or the second fraction of fly ash can be separated into the third fraction of fly ash and the fourth fraction of fly ash by density by fluidization in a fluidized bed column in the absence of water using air. Also, the first fraction of fly ash and/or the second fraction of fly ash can be separated into the third fraction of fly ash and the fourth fraction by air classification.

It can be beneficial to separate (such as by screening) the fourth fraction of fly ash into a fifth fraction of fly ash having particle sizes greater than a second predetermined particle size and a sixth fraction of fly ash having particle sizes less than or equal to the second predetermined particle size. In one version of the invention, the second predetermined particle size is in the range of 21 to 126 microns. One example of a second predetermined particle size is 21 microns, and in this example, particles of 20 microns or less would be separated into the sixth fraction.

Alternatively, it can be beneficial to separate (such as by centrifuging) the fourth fraction of fly ash into a fifth fraction of fly ash having particle densities greater or equal to a second predetermined particle density and a sixth fraction of fly ash having particle densities less than the second predetermined particle density. One example of a second predetermined density is 1.0 g/cc, while another example second predetermined density is 2.0 g/cc.

In another aspect of the invention, fly ash is classified by density, and then separated into narrow particle size fractions. The advantage of density separation and then separation (such as by screening) of fly ash into narrow size fractions is that it can yield both solid and hollow fly ash particles separated in different size ranges. Both solid and hollow fly ash particles, separated in different size fractions, especially the ultra fine size fractions, can yield better properties in composites and higher prices in the market.

In this version of the method of the invention, the amount of cenospheres in a fly ash sample, as measured by a volume percentage or a weight percentage, is increased. First, an amount of fly ash having an initial percentage of cenospheres is classified into a first fraction of fly ash having particle densities greater than a predetermined particle density and a second fraction of fly ash having particle densities less than or equal to the predetermined particle density. Second, the first fraction of fly ash or the second fraction of fly ash is separated into a third fraction of fly ash having particle sizes less than or equal to a predetermined particle size and a fourth fraction of fly ash having particle sizes greater than the predetermined particle size such that the fourth fraction of fly ash has a percentage of cenospheres greater than the initial percentage. In an example version of this method, the initial percentage of cenospheres in the fly ash sample can be about 1% to about 10%, as measured by a volume percentage or a weight percentage, and the percentage of cenospheres in the fourth fraction of fly ash is at least 40%, preferably at least 70%, more preferably at least 90%, and most preferably at least 95%.

The fly ash can be a byproduct of burning bituminous coal and/or subbituminous coal. In an example version of the method, the fly ash can be a byproduct of burning subbituminous coal and fly ash recovered from a previous burning of coal. The fly ash can include lime at a level of about 10% or more. The fly ash can be ASTM C 618 Class C fly ash. The fly ash can be cementitious.

The initial fly ash sample can be separated into a first fraction of fly ash (having greater densities) and the second fraction of fly ash (having lesser densities) by fluidization in a fluidized bed column in the absence of water using air. Also, the first fraction of fly ash and/or the second fraction of fly ash can be separated by air classification. The initial fly ash sample can be separated into a first fraction of fly ash (having greater densities) and the second fraction of fly ash (having lesser densities) using various predetermined densities as the break point between the first fraction of fly ash and the second fraction of fly ash. For example, the predetermined density may be any density up to 3 g/cc. In one version of the invention, the predetermined density is in the range of 0.5 to 3.0 g/cc. One example predetermined density is 1.0 g/cc, while another example predetermined density is 2.0 g/cc.

The first fraction of fly ash or the second fraction of fly ash can be separated into a third fraction of fly ash having particle sizes less than or equal to a predetermined particle size and a fourth fraction of fly ash having particle sizes greater than the predetermined particle size by dry screening. The fly ash may be screened more than one time to produce the third fraction and the fourth fraction. The fly ash can be screened a first time with a first screen and a subsequent time with a second screen of a different material. The first fraction of fly ash or the second fraction of fly ash can be separated in the absence of water to avoid agglomeration of particles. The first fraction of fly ash or the second fraction of fly ash can be separated into a third fraction of fly ash (having smaller particle sizes) and the fourth fraction of fly ash (having larger particle sizes) using various predetermined particle sizes as the break point between the third fraction of fly ash and the fourth fraction of fly ash. For example, the predetermined particle size may be any size up to 200 microns. In one version of the invention, the predetermined particle size is in the range of 20 to 125 microns. One example of a predetermined particle size is 38 microns.

It can be beneficial to separate (such as by screening) the fourth fraction of fly ash into a fifth fraction of fly ash having particle sizes greater than a second predetermined particle size and a sixth fraction of fly ash having particle sizes less than or equal to the second predetermined particle size. In one version of the invention, the second predetermined particle size is in the range of 21 to 126 microns. One example of a second predetermined particle size is 21 microns, and in this example, particles of 20 microns or less would be separated into the sixth fraction.

In the fourth fraction of fly ash, at least some of the cenospheres can have a density less than or equal to 1 g/cc. Also, at least some of the cenospheres in the fourth fraction of fly ash can have a density greater than 1 g/cc. Also, at least some of the cenospheres in the fourth fraction of fly ash have a density greater than 2 g/cc.

In yet another aspect of the invention, there is provided a method for identifying hollow particles in a sample of particles having solid particles and hollow particles. In the method, a sample of particles having solid particles and hollow particles is spread on a layer of liquid, the sample of particles is viewed with a light microscope, and viewed particles having a central darkened area are identified. The viewed particles having a central darkened area are hollow particles. All viewed particles having a central darkened area can be counted to provide a number of hollow particles in the sample, and all particles in the sample can be counted to provide a number of all particles in the sample. A ratio of the number of hollow particles to the number of all particles in the sample is then calculated. In one embodiment, the sample comprises fly ash particles, and in another embodiment the sample consists essentially of fly ash particles.

In still another aspect of the invention, there is provided a method for identifying particles of different density in a sample of particles. In the method, a sample of particles having particles of at least two different densities is spread on a layer of liquid. The sample of particles is viewed with a light microscope, and viewed particles floating on the layer of liquid are identified. The viewed particles floating on the layer of liquid having a lower density than particles not floating on the layer of liquid. Viewed particles floating on the layer of liquid that have a central darkened area can also be identified. The viewed particles having a central darkened area are hollow particles. In one embodiment, the sample comprises fly ash particles, and in another embodiment the sample consists essentially of fly ash particles.

Experiments of screening fly ash have indicated that the particle size distribution obtained is very dependent on the screening process and equipment used. For example, during inclined vibratory screening processes through 400 mesh screen, the +400 mesh fraction still contained an amount (about 30%) of particles which were below 400 mesh in size indicating the difficulties in true size separation by screening at the finer size ranges. (All mesh sizes herein are US Sieve Series.) Therefore, in one version of the invention, it is preferred to recycle the fly ash one or more times during screening or to use screens of different materials. Advanced techniques of screening, including ultrasonic sifting may be beneficial to separate finer fractions of fly ash by size. The rate of screening, the cost of screening and wear of screens are some of the variables in size separation of fly ash.

In the invention, fluidized bed separation of a screened fraction (e.g., +400 mesh) of fly ash can lead to a significant increase in the weight or volume fraction of cenospheres in the carried over fraction of fly ash. For example, the percentage of cenospheres in the carried over fraction in small height fluidized bed equipment was about 40% by volume, compared to a level of 10% in the as collected fly ash. Further screening after fluidized bed separation can lead to a percentage of cenospheres of about 98% by volume, compared to a level of 10% in the as collected fly ash.

The invention is further illustrated in the following Examples which are presented for purposes of illustration and not of limitation.

EXAMPLES

I. Overview

The investigative work was directed to demonstrate the feasibility of removing cenospheres from as collected fly ash using a dry process. Dry processes are advantageous because it is not always possible to use conventional water flotation processes. Some fly ash particles, especially ASTM C 618 Class C fly ash with high lime content, have self-cementitious properties, and they will tend to agglomerate, making their separation by size and density difficult.

Work was done on trying to separate cenospheres by size and by density using a one step dry air classification process on as collected fly ash. While these attempts showed some promise, small solid and large hollow particles were collected at the same location due to an overlap in their densities and terminal velocities. Laboratory scale jet sieve work was successful in size classification followed by floatation in water; however floatation in water cannot be used on a large scale with ASTM C 618 Class C fly ash because the remainder of the fly ash would solidify and then be unusable as a cementitious material. It was determined that further investigations were necessary to determine the effect of different process variables in order to arrive at the optimum process parameters to produce the best results in terms of recovery of cenospheres of different sizes, densities and characteristics from fly ash.

The properties of fly ash collected from the literature and measured for the fly ash (often designated PPPP fly ash) used in the examples herein are given below.

1. Size: 0.4 μm-200 μm (25% less than 10 μm).
2. Density: 0.4 g/cc to 3.0 g/cc. For cenospheres, the wall thickness can be 7-10% of the diameter. The wall of cenospheres can be non-uniform in thickness and have porosity as has been observed during reflected light microscopy of cross sections of fly ash.
3. Resistivity: $10^9$-$10^{11}$ ohm-cm between 250-450° C., maximum at 350° C.
4. Surface Area: 1.313 square meter/gram as measured in this study using a BET (Branuer, Emmit, and Teller) apparatus.
5. Surface charges on siliceous particles like fly ash during transport can be in the range of $10^{-4}$ coulombs/kg. Polarity on cenospheres are the same as on other ash constituents. Ash attains a negative charge and carbon attains a positive charge, and this has been used to separate coal from fly ash. The surface charge on solid and hollow fly ash particles is likely to be the same but their dielectric constants would differ due to the gas in cenospheres, and this may facilitate separation.
6. Cohesive forces between fly ash can be in the range of 0 to 200 N/m² depending upon the electric field strength.
7. Compressive strength of fly ash cenospheres is in the range of 2000-4000 psi.
8. Thermal Conductivity: 0.11 $Wm^{-1} K^{-1}$ for cenospheres; melting point 1200 to 1600 K; Mohs Hardness five to six.

A. Relationship Between Weight and Volume Percentage of Cenospheres

As will be discussed below, for cenospheres with a density of 0.5 g/cc and solid particles with a density of 2.0 g/cc, the volume percentage of cenospheres will be about three times their weight percentage in fly ash.

However, as the density of cenospheres increases the ratio of volume percentage to weight percentage of cenospheres decreases. For instance, ten volume percent of cenospheres with a density of 2.0 g/cc, mixed with 90 volume percentage of solid fly ash of 3.0 g/cc, would correspond to a 6.90 weight percentage of cenospheres. Ten volume percentage of cenospheres with a density of 1.5 g/cc mixed with 90 volume percentage of solid fly ash of density 2.5 g/cc would correspond to 6.25 weight percentage. These numbers have been arrived by simple conversion of volume percentages into weight percentages using estimated density values.

A range of weight and volume percentage of cenospheres in as-collected fly ash has been reported in literature. An earlier report by the Electric Power Research Institute estimated 20 volume percent of cenospheres in class F fly ash. Other studies report weight percent of cenospheres in the range of one to two weight percent. This presumably refers only to cenospheres which float on water and have density less than 1.0 g/cc.

In the present work, the weight percentage of cenospheres with density less than 1.0 g/cc determined by heavy media separation in the Class C fly ash used in the examples herein was 1.875%. The weight percent of cenospheres with: a. density less than 1.74 g/cc was 5.625%, b. density less than 2.049 g/cc was 11.25%, c. density less than 2.277 g/cc was 13.625%, d. density less than 2.509 g/cc was 81.063%, and e. density less than 2.965 g/cc was 99.313%. In the present work, water centrifuging of the fly ash used in the examples herein resulted in 0.6 weight percent of cenospheres with density less than 1.0 g/cc. Transmission optical microscopy estimated 10 volume percent hollow particles in the fly ash used in the examples herein.

II. Different Techniques Used to Estimate the Volume Percentage of Cenospheres in Fly Ash

1. Estimation of Percentage of Cenospheres in Fly Ash

A. Transmitted Light Optical Microscopy

The procedure developed involves spreading fly ash on a layer of organic liquids of known density and refractive index (Fryquel with a density of 1.145 g/cc) and observing the image through transmitted optical light. The method is simple and quick and gives the best estimates of diameters of fly ash. In addition, the appearance of a bull's eye in fly ash particles during transmitted light microscopy has been established as an indication that they are hollow cenospheres. There is also some sedimentation and floatation of particles in the organic liquid layer and this permits some density separation by density and size on the glass slide itself; the microscope can be focused on the top and bottom layers to examine the fly ash which has floated versus the fly ash which has settled in the fluid layer. The fly ash that floats to the top of the Fryquel will have a density lower than 1.145 g/cc.

B. Reflected Light Microscopy

In order to complement the transmitted light microscopy and examine the internal structure of fly ash, including wall thickness of cenospheres, fly ash was mounted in polymers and the mounts were sectioned and polished to examine the cross sections through reflected light microscopy. This technique showed the internal structure of fly ash particles, including the porosity and thickness of walls of cenospheres. However the estimation of size of fly ash will be difficult since it will depend upon the plane of section relative to the diametrical plane of the cenosphere. It should be noted that while this technique is very powerful, it is time consuming and can give errors in diameters of particles and wall thickness. A hollow particle can appear solid if it is sectioned very close to its surface at a distance less than the thickness of the wall. The technique did show that walls of cenospheres are often non-uniform in thickness and porous and there are smaller particles within pleurospheres and on the surfaces of fly ash agglomerates.

C. Scanning Electron Microscopy

Limited scanning electron microscopy of as received and mounted and polished sections of fly ash was done. This technique appeared to be better in revealing the character of walls if the cenosphere is mounted and polished.

D. Settling in Fluids Including Water and Glycerin

Fly ash was suspended in selected liquids and allowed to settle or float to give density separation. However, when the Class C fly ash used in the examples herein was left overnight in water to separate cenospheres of density less than one gram per cc by floatation, the fly ash reacted with water showing growths of crystals on the surface. Some settling experiments were done in glycerin which has a density of 1.275 g/cc; these did not show any signs of reaction.

E. Centrifuging in Water and Heavy Fluids

In order to reduce the time of contact between water and fly ash, the suspension of fly ash was centrifuged for ten minutes at speeds close to 1800 rpm in 30 cm. tubes to float cenospheres and other material less than one gram per cc in density; these were weighed after filtering through a cellulose filter. Heavy fluids of varying densities were created by mixing two heavy fluids in different proportions, and centrifuging suspensions of fly ash in these mixtures. This enabled density separation of fly ash where cenospheres of densities up to 2.9 grams per cc could be floated and examined.

F. New Definition of Cenospheres

Generally cenospheres have been defined as hollow fly ash particles with density less than 1 g/cc in the range of 0.6-0.8 g/cc. This definition stems from the common practice of collecting floating cenospheres from the surface of ash ponds where only cenospheres with a density of less than 1.0 g/cc are harvested. The work in the present study has shown that hollow fly ash particles can have a density as high as 2.9 g/cc depending upon the degree of hollowness and the size and the wall thickness of cenospheres. The density of completely solid fly ash can be as high as 3.2 g/cc; this could be due to the presence of other heavier oxides like iron in the silica matrix of fly ash. The cenospheres could therefore have densities much higher than 1.0 g/cc and the heavier cenospheres with less hollow space could also have uses as fillers and reinforcements since they will be much stronger due to greater wall thicknesses. Apparently one reason that the weight percentage of cenospheres in fly ash has generally been reported to be less than 2%, is the fact that only cenospheres less than the density of 1.0 g/cc have been taken into account. If all the cenospheres with any hollow space and densities much higher than 1.0 g/cc are taken into account, the weight percentage of cenosphere in fly ash will be much higher than heretofore mentioned in the literature. In fly ash since the "bull's-eye" method of identifying the hollow cenospheres during transmission optical microscopy would count all cenospheres which have any hollow space with densities as high as 2.9 g/cc, this method will lead to much higher estimates of volume percentage of cenospheres, compared to the values obtained where cenospheres are floated on water or centrifuged in water. A prudent strategy is to explore separation and use of the whole range of cenospheres, those with densities less than 1.0 g/cc, as well as those with densities above 1.0 g/cc and up to 3.0 g/cc. In addition, generally the cenospheres available in the market are 70 microns or larger in size whereas the cenospheres in Class C fly ash used in the examples herein are much smaller with diameters as small as one micron, which will have greater value.

III. Classification, Screening and Air Fluidized Bed Separation of Fly Ash Cenospheres

A. Air Classification Test

Air classification in a dynamic centrifuge was performed on fly ash to separate cenospheres from fly ash. However, the results were only partly successful since fine solid particles were collected with cenospheres. It was hypothesized that classification is a statistical process where particles are separated by density and size due to the differences in centrifugal forces and buoyancy forces. In the case of fly ash, due to the overlap between particle sizes and densities, one can never get a perfect separation by either size or density in a single run. Thus, it appeared that the best strategy would be to first screen out the fine fraction which has less cenospheres (as discussed below), and then subject the coarse fraction to screening in narrow size ranges and to classification in a classifier to separate the cenospheres from solid fly ash particles. Depending on the specific source of fly ash, this separation may also not be complete and there may be smaller solid particles mixed with cenospheres. This may require a third step of screening by size or additional air classification. In other words, it may require a three step screening-classification-screening/classification process to separate cenospheres from fly ash.

B. Screening Test 1

A particle screening test was performed using a Micron Air Jet sieve. The test of the Class C fly ash used in the examples herein indicated that 97.12 percent material passed through 100 micron sieve, 93.96 passed through 75 micron, 85.68 passed through 45 microns, and 73.40 passed through 38 micron sieve. See Table 1 below. This suggested that the initial screening of fly ash prior to classification can be through a 38 or 45 micron sieve. The coarser material can then be classified to separate lighter cenospheres; however, there is a good likelihood that some fine solid particles which also will be light may be mixed with cenospheres. The final step can be another screening to separate the fine solid particles from larger hollow cenospheres.

TABLE 1

Screening Analysis Report for Fly Ash Done on Micron Jet Screen

|   | Sieve Size [Micron] | [Mesh#] | Sieving Time [secs] | Vacuum Press [In H$_2$O] | Sample Weight Before [g] | After [g] | Percent Pass Through Cum. [%] | Diff. [%] |
|---|---|---|---|---|---|---|---|---|
| n | 38 | 400 | 120 | 11.3 | 40.57 | 10.79 | 73.40 | 73.40 |
| 2 | 45 | 325 | 120 | 9.3 | 10.79 | 5.81 | 85.68 | 12.28 |
| 3 | 75 | 200 | 120 | 10.4 | 5.81 | 2.45 | 93.96 | 8.28 |
| 4 | 100 | 150 | 120 | 10.8 | 2.45 | 1.17 | 97.12 | 3.16 |

C. Screening Tests 2 & 3

Further particle screening tests were done on the Class C fly ash used in the examples herein. Since wet screening is not preferred, dry screen analyses were done using a Roto-Tap unit with small washers on each level that bounce to attempt to minimize agglomeration. The results of two Roto-Tap analyses are as follows. Test three was done with a full complement of screens and test two was done on a small sample with only four screens.

| SCREENING TEST 2 | |
|---|---|
| 1.2% | +100 mesh |
| 13.1% | +200 mesh |
| 87.2% | +325 mesh |
| 89.6% | +400 mesh |

| SCREENING TEST 3 | | | |
|---|---|---|---|
| U.S. No. | % Gram | % Ret. | Sieves Cum. |
| 100 | 0.1 | 0.51 | 0.51 |
| 120 | 0.1 | 0.5 | 1.02 |
| 140 | 0.1 | 0.51 | 1.53 |
| 170 | 0.4 | 2.04 | 3.57 |
| 200 | 0.9 | 4.59 | 8.16 |
| 230 | 2.4 | 12.24 | 20.41 |
| 270 | 2.6 | 13.27 | 33.67 |
| 325 | 2.1 | 10.71 | 44.39 |
| 400 | 2.8 | 14.29 | 58.67 |
| 500 | 3.6 | 18.37 | 77.04 |
| 635 | 1.5 | 7.65 | 84.69 |
| PAN | 3.0 | 15.31 | 100.00 |

D. Separation of Cenospheres Using Screening, Classification & Air Fluidization In the above-described air classification work, the classifier included a rotating turbine wheel into which fly ash was fed. The smaller particles are sucked into the wheel by centripetal forces and separated from the larger particles which are pushed away by centrifugal forces. However in the case of fly ash, a large percentage of larger diameter particles are also hollow and have a lower density. An analysis suggested that even when all the particles have the same density, the classifier is less than 100% efficient in separating particles by weight. There is always some overlap between the particles; some lighter particles are along with the heavier particles and vice versa. In the experiments the separation of cenospheres from fly ash was less than optimum. Such an overlap may be inevitable given the overlap in the density and size of solid and hollow and solid particles of fly ash.

Further analysis indicated that the smaller the size distribution of the particles being classified, and the closer the density of the fluid used in classification to the density of the particles, the better will be the separation by density. Since it will be difficult to get gases with a higher density close to the particles (except by using very high gas pressures), it was decided to use narrower size fractions of fly ash for classification. This implied that the separation is preferably first done by size and then by density, instead of first by density and then by size.

A Micron Jet sieve analysis was conducted for the Class C fly ash used in the examples herein and it was decided that initially the fly ash should be separated into a +400 mesh and a −400 mesh fractions and then try to separate cenospheres from these size fractions. Later on as the next step, the fly ash could be separated into a larger number of size fractions, and each size fraction separately classified to yield cenospheres of the particular size. This process would yield cenospheres of different sizes which can be marketed at higher prices as compared to the mixed size cenospheres. Vendors of manufactured hollow particles market them by different sizes, generally the finer narrower size fractions being higher in price. In addition, it would yield solid fly ash particles in different size ranges which would also potentially yield a higher price.

In view of this, samples of the Class C fly ash used in the examples herein were screened into +400 and −400 size fractions, for further processing by density separation for cenospheres using classification or fluidized bed separation. Samples of +400 and −400 mesh fly ash were obtained for microscopic analysis and for fluidized bed separation of cenospheres from +400 mesh fraction by air elutriation.

The samples of +400 and −400 mesh fly ash were examined using optical transmission microscopy. The +400 mesh fraction still showed a lot of below 400 mesh particles (about 45% by weight) indicating that even screening is not able to achieve a 100% efficiency in separation of fine particles. Screening through a 400 mesh appears to be only 55% efficient.

Experiments were run on sedimentation and centrifuging to get an idea of the percentage of cenospheres in fly ash. These were done using two methods. In one case, samples of fly ash were suspended in water (1.0 gm/cc) or glycerin (1.25 gm/cc) or Fryquel (1.145 gm/cc), and held to sediment the heavier particles which presumably were solid with densities higher than the three respective liquids. In certain cases, the suspensions were sonicated for extended periods to deagglomerate particles to help in separation of lighter particles from heavier particles. The lighter particles with densities lower than the liquids presumably remained in suspension near the top layer. In some of these experiments where the fly ash was sonicated overnight in water, there were indications of some reaction of Class C fly ash with water, and formation of angular crystallites on the surface of fly ash; which changed the density and shape of the particles making the data unusable.

In view of this it was decided to use methods in which the contact time with water is reduced. Therefore in other experiments the fly ash was suspended in water and centrifuged to separate hollow particles with density less than one from the rest of the fly ash. In centrifuging, the contact time between water and fly ash is considerably reduced. Samples were obtained of fly ash recovered from a fly ash reburn process as described in U.S. Pat. No. 5,992,336. Five gram and two gram samples of +400 and −400 unwashed fly ash samples were added to 100 ml. of deionized water and centrifuged for ten minutes at 1800 rpm to separate cenospheres and other constituents of fly ash with densities less than 1 g/cc. The floating layer from the +400 mesh was collected and examined microscopically; the layer which sedimented in the conical bottom part of the glass tube was about 90 percent by weight of the +400 mesh centrifuged material suggesting that about 10% of fly ash by weight has a density less than 1 g/cc. In the case of −400 mesh fly ash, the percentage of fly ash which sedimented was about 87%, implying that about 13% of −400 mesh fly ash has less than 1.0 g/cc density. This suggested that −400 mesh size fly ash has slightly greater weight percentage of cenospheres than +400 mesh, assuming that much of the material floating in the water consists of cenospheres with density less than 1.0 g/cc. However, the estimates of volume percent of all cenospheres using transmission optical microscopy is 20% to 30% in +400 mesh fraction and 2% to 3% in −400 mesh fraction. If most of the floated fly ash is cenospheres, it would imply very large volume fractions, of the order of 20 to 30 volume percent of cenospheres in the reburned fly ash. This may be a special characteristic of reburned fly ash. In the fly ash reburn process about 1-3% of bituminous coal based fly ash from a boiler is mixed with pulverized coal and combusted in the boiler; assuming that 5% pulverized sub-bituminous coal will be new fly ash, approximately 25% fly ash will have been through the boiler two times and is likely to have different characteristics than the fly ash which has been through the boiler only once.

It should be noted that the volume percent of cenospheres reported herein is based on the transmission optical microscopy and this number would represent the volume of all cenospheres which have hollow spaces in them. In contrast to this, the method of sedimenting or centrifuging in water and weighing the portion on the top only gives the weight percent of cenospheres which are lighter than water and have a density less than 1 g/cc. It is clear that screening and fluidization significantly increases both the volume percent (as determined by transmission optical microscopy) and weight percent (as determined by centrifuging) of cenospheres in fly ash as discussed below.

Samples of screened fly ash (+400 mesh and −400 mesh) were obtained. These were examined using transmission optical microscopy. The technique consisted of spreading a small sample on a liquid L-RIB-1162 from Cargille Laboratories, New Jersey, USA with a controlled refractive index of 1.68 on a glass slide and then examining the fly ash using transmitted light at 100 and 500 magnifications. This technique has been used to identify hollow cenospheres through the bull's eye that is believed to be exhibited only by hollow cenosphere particles. While the fly ash particles are dropped on the film of this liquid on a glass slide, some particles which are lighter come to the top layer of the liquid and are examined by focusing light on the top layer of the liquid film; when the focus is moved down to the bottom part of the film one can see the fly ash which has not floated to the top layer within the thin film. There is also the possibility of the Cargille fluid acting as a surfactant and helping to disperse fly ash particles which may have been agglomerated in air. It was concluded that mounting and polishing of fly ash followed by reflected light microscopy would be needed to distinguish solid from hollow particles, and this was done. The results on volume percent cenospheres estimated by transmission light microscopy in different size fractions of washed +400 and −400 mesh are included in FIG. 1. The flow chart indicates that while some cenospheres are less than 20 microns in size, most of the cenospheres are around 38 to 80 microns in size.

TABLE 2

RESULTS OF SCREENING OF PPPP FLY ASH AND CENOSPHERES IN DIFFERENT SIZE FRACTIONS

The numbers in parentheses are estimates of volume percent cenospheres in the different size fractions, as determined by Transmission Optical Microscopy PPPP Fly Ash (10%)
- Oversize 400 Mesh (20%) [Unwashed]
  - Washed:
    - Pan (>1%)
    - 635 Mesh (2 - 3%)
    - 500 Mesh (5%)
    - 400 Mesh (10 - 20%)
    - 325 Mesh (10 - 20%)
    - 270 Mesh (5 - 10%)
    - 230 Mesh (3 - 5%)
    - 200 Mesh (3 - 5%)
    - 170 Mesh (3 - 5%)
    - 140 Mesh (1 - 2%)
    - 120 Mesh (2 - 3%)
- Undersize 400 Mesh (2 - 3%) [Unwashed]
  - Washed:
    - Pan (30 - 40%)
    - 625 Mesh (30 - 40%)
    - 230 Mesh (30 - 40%)
    - 200 Mesh (10 - 20%)
    - 170 Mesh (5 - 10%)

The microscopic examination of screened samples did indicate that even in the +400 mesh oversize fraction which appeared grey, considerable amounts of very small fly ash particles (of the order of 60% and sometimes as small as 20 microns) were present. This suggests that even the size separation by screening is not 100% efficient. Washed and rescreened samples were also micro photographed and the results were analyzed. The +400 mesh unwashed sample showed 20 to 30 volume percent of cenospheres using the current technique. Frequently one could observe material within the cenospheres confirming that they were hollow; in several instances the large cenospheres contained hollow cenospheres within them or had smaller cenospheres sticking to their surfaces. The −400 mesh sample unwashed which appeared grey also showed a very large fraction of cenospheres but very little coal; this suggests that careful screening around 38-50 microns can concentrate all the unburnt coal in the coarser fractions.

In addition, +400 mesh oversize samples were analyzed in experiments of separation of hollow particles by fluidized bed airlifting. These samples which were separated in carry over and bed fractions by fluidized bed were examined. These samples were fluidized in beds of depths 3.25 inch and 1.5 inch and air at inlet temperature of 68-70° F. and surface speeds ranging from five sfpm to 105 sfpm were introduced in three experiments. A sample of fly ash which was carried over by air and which was left in the bed was obtained for all three experiments. The experiments indicated that first carry over of fly ash was obtained at 35-38 sfpm; above that minimum critical velocity, the higher the air velocity the higher was the percentage carry over, and lesser was the material left in the bed. The batch size was 350 grams in all cases; the bed depth was 3.5 inches in experiment one and 1.5 inches in experiments two and three.

Looking at FIG. 2, in experiment Test #1 with an air velocity of 35-50 sfpm, 94.3% material remained in the bed and 5.7% was carried over. The carried over material contained around 40 volume percent cenospheres ranging from five to 100 microns as compared to only ten volume percent of cenospheres in the original fly ash, indicating a concentration of four times. The carried over material contained some solid spheres, coal particles, angular silica material and fluffy material in addition to cenospheres. The carried over material was also centrifuged. In this case, the bed material had larger amounts of solid spheres, coal and silica, and contained only 5.44 weight percent cenospheres (five to 86 microns) which floated to the top layer of mounting liquid. This result suggests that screening through 400 mesh and fluidizing air at 35 sfpm concentrates up to 40 volume percent cenospheres in the carried over material. The ability of screening and air fluidization to concentrate the cenospheres was also demonstrated by weight percentages of cenospheres determined by centrifuging in water. The weight percentage of cenospheres in the Class C fly ash used in the examples herein is about 0.6% and after screening through 400 mesh, it increased to 1% in the +400 fraction, and after air fluidization at 35 to 50 sfpm it increased to 5.44% by weight.

Still looking at FIG. 2, in experimental Tests #2 and #3 when the fluidization air velocities were around 80 sfpm and 100 sfpm, the percentages of cenospheres in the carried over material were 40% by volume (five to 70 microns) and 15% by volume (five to 108 microns) respectively. The initial bed material carried over in experimental Test #2 was 19% and in experimental Test #3 was 64%. In experiments #2 and #3, the bed material contained 5% by volume (five to 160 microns) and 1.2% by volume (five to 64 microns) cenospheres respectively in the top layer; the bottom layers contained solid spheres, coal, silica and fluff. These fluidization experiments suggest that fluidizing air velocity of around 35-80 sfpm may be better to concentrate cenospheres in the carried over material.

The Flow Charts of FIGS. 1, 2 and 3 give the quantitative results of volume or weight percentage of cenospheres recovered from the Class C fly ash used in the examples herein (PPPP fly ash) after the screening, fluidized bed separation and centrifuging in water.

E. Results of Classification, Screening and Fluidized Separation Tests

Straight air classification of fly ash is not likely to separate cenospheres due to the wide range of overlapping sizes and densities.

Depending on the circumstances, it may be necessary to narrow down the size distribution of fly ash to improve the efficiency of classification or fluidized bed separation processes.

It is likely that there is some concentration and separation of cenospheres and fly ash by size and density in successive hoppers in currently used electrostatic separators or bag house fabric filters in a coal fired power plant.

The Class C fly ash used in the examples herein has about ten volume percentage of cenospheres as determined by transmission optical microscopy. This percentage can be increased to 40 volume percentage by first screening through 400 mesh screen and then air classifying the +400 fraction. Screening through the +400 mesh screen appears to increase the volume percent of cenospheres from 10% to 20% in the +400 mesh section.

After washing the +400 mesh screened fly ash, and re-screening it through eleven size fractions, the highest volume percentage (5%-20%) of cenospheres were in the size range 270 to 400 mesh.

After washing the −400 mesh screened fly ash and re-screening it through finer size screens, the highest volume fractions of cenospheres were in the size range pan to −500 mesh (30-40 volume percent).

Even simple screening through 400 mesh used so far does not separate all the fines from coarse fractions. A large volume of fractions of cenospheres below 400 mesh is found in +400 mesh fraction.

The Class C fly ash used in the examples herein contains about 0.6% material by weight which is less than 1.00 g/cc in density as determined by centrifuging in water; this material is mostly hollow cenospheres but it does contain small fractions, less than five volume percent, of other materials including coal. This weight percentage of light materials increases to about one percent by screening in +400 mesh fraction, and it further increases to about 5.5% in the carried over fraction after the +400 mesh fraction is fluidized in air at velocities between 35 and 50 sfpm.

IV. Separation of Cenospheres in Electrostatic Precipitators

There is a possibility of classification of fly ash in electrostatic separators to facilitate separation of cenospheres. In the current electrostatic separators, the airborne stream of fly ash flows from a coal boiler between charged plates and the charged fly ash is attracted by the plates and is collected in a series of hoppers; the material collected by the series of hoppers is again mixed while it is being collected. Since the charge acquired by particles will vary with their size, chemical make-up, and their movement in the precipitator will also depend upon their density and size, there is a possibility that some classification of fly ash occurs between different hoppers of the precipitator.

It was considered worthwhile to collect the material from the hoppers in series separately instead of mixing them since they may be already considerable classification from the first hopper to the next. The cenospheres and very fine solid particles may be in much higher proportions in certain hoppers. It was decided to sample fly ash from successive hoppers to confirm if the material in hoppers down the line had a very large percentage of cenospheres. If this is indeed the case, then utilities may find it worthwhile to separately collect the material from successive hoppers to get partially classified material, especially material with a very large percentage of cenospheres, from one of the hoppers. In addition to looking into the variation in sizes and densities between successive hoppers, it will be useful to look into the variation in charges on particles from one hopper to the next. It is possible that in hoppers later down the line, the charges are weaker, allowing particles to travel longer without being captured.

The charges on particles are very likely due to triboelectric phenomenon when these particles with different potentials and work functions rub against each other during transport and movement. It may be possible to modify the flow of these particles to modify charge accumulation on them. It may also be possible to at least neutralize some of the charge using external field or grounding mechanisms. Some measurements on charges on individual particles have been collected from the literature.

Particles may be charged with a given type of charge using a process similar to INDIGO (see www.indigotechnologies-us.com). In this process, particles are charged with opposite charges by sending them through bipolar chargers, to agglomerate them to increase their size and prevent them from floating out of the power plant stack. In theory, one could use only one charger so that all particles will have the same charge and they will repel each other instead of agglomerating as is the case with the Indigo process.

A. Differences in Cenospheres Between Different Hoppers Analysis of Fly Ash from Inlet and Outlet Hoppers Work was done to examine the difference in characteristics of fly ash, especially the size and amount of cenospheres in inlet and outlet hoppers of a coal fired power plant. Precipitators at the power plant studied are arrayed to collect fly ash across four fields. The first field collects 70% of the ash, the second collects 21% (70% of the 30% that is left), the third 6.3% and the fourth 1.89%. There are two places to sample at inlet hoppers that combine the first two fields (91% of the ash) or outlet hoppers that combine the last two fields (less than 9%).

Samples of fly ash from inlet and outlet hoppers at the power plant were collected to determine if there is any concentration of cenospheres between different hoppers. Two samples, #2 and #3, were taken from outlet hoppers at slightly different locations. Sample #1 was taken from inlet hoppers. The inlet hopper sample looked darker compared to the samples from the outlet hoppers. The bulk density of samples #2 and #3 were about two times that of sample #1, and sample #3 had more clumps which broke apart easily.

Sample #1 from inlet hopper was mounted on slide with 1.68 HD refractive index, and optical microscopic examination indicated about five to 10% by volume of cenospheres mostly floating to the top layer of the mount. The size range of cenospheres was between 6-140 microns with an average of 16-30 microns. A two gram sample of this fly ash was mixed with water and centrifuged for ten minutes at 1800 rpm and then the floating top fraction, the middle layer and the sedimented layers were weighed using a filter paper. The samples indicated 1.34% by weight of top layer (which was mostly cenospheres in the range of 16-30 microns range), 0.006% middle layer, and 98.72% sediment. The total recovery in water centrifuge was about 100% indicating very little solubility in water. Samples #2 and #3 showed only 92.9% and 85.64% recovery after water centrifuging indicating greater fractions of water soluble content in the outlet fly ash.

Sample #2 was also mounted on a slide using 1.68 HD and showed 2-3% cenospheres by volume. Upon centrifuging this sample showed 0.30 percent cenospheres, 12-20 micron size, by weight in the top floating layer, 0.006% by weight in the middle layer, and 92.6% sediment, with a total recovery of 92.9%. This indicated a much lower percentage of cenospheres in outlet hopper sample #2 than in sample #1 from inlet hopper.

Sample #3 showed only 1-2% cenospheres by volume in the microscope. Upon centrifuging it showed 0.02% cenospheres in the top layer, nothing in the middle layer and 85.62% sediment, indicating a total recovery of 85.64% suggesting a 14% water soluble fraction which is much higher than samples #1 and 2. The top layer showed very few cenospheres and also few clear spheres. This sample #3 from the outlet hopper also showed very few cenospheres compared to sample #1 from inlet hopper and sample #2 from outlet hopper.

The above studies indicate that there is higher concentration of cenospheres in the inlet hopper compared to the outlet hoppers. Earlier work had indicated that the fly ash from mixed hoppers had only 0.6% cenospheres whereas the inlet hopper sample had 1.34% cenospheres by weight and the outlet hopper had only 0.02% cenospheres.

Conversion between volume fraction and weight fraction of cenospheres, if one assumes a density of 0.6 for cenospheres and a density of 2 g/cc of solid fly ash the weight percent cenospheres will be equal to volume percent cenospheres×0.6/volume percent cenospheres×0.6+volume percent solid fly ash×2.00. Using this formula, seven volume percent cenospheres are roughly equivalent to 2.25 weight percent cenospheres in fly ash. This ratio will be different for different types of cenospheres. However for convenience we will assume that on an average the volume percentage of cenospheres of density less than 1.0 g/cc is about three times their weight percentage as determined by water centrifuging.

It appears from this study that inlet hoppers have higher percentages of cenospheres than the outlet hoppers. This is true for cenospheres of density less than 1.0 g/cc as identified by water centrifuging, as well as for cenospheres with higher densities, which are identified as cenospheres using transmission optical microscopy.

In addition the cenospheres in the inlet hoppers are coarser and the fly ash in inlet hoppers is less water soluble as compared to outlet hoppers. The bulk density of outlet hoppers is also about twice that of inlet hoppers.

V. Screening, Air Fluidized Bed Separation, and Screening of Fly Ash Cenospheres

A. Experiments

Narrow size fractions were screened out from as collected PPPP fly ash. The screens were vibrated at selected frequency and they were able to screen small as well as large (compound) batches of fly ash. The PPPP fly ash was screened into −25 micron, +25 −37 micron, +37 −45 micron, +54 −64 micron, +64 −74 micron, +74 −120 micron, and +120 −150 micron size fractions. In addition, the PPPP fly ash was screened into −25 micron, −37 micron, −54 micron, −64 micron, −74 micron, and −120 micron size fractions. All these size fractions have 1-5 volume percent cenospheres. The size fractions were prioritized for air fluidization density separation based on the total amount of cenospheres present in each size fraction; the −25 micron size fraction has the potential of the maximum volume of cenospheres but it could not be fluidized.

An eight foot tall wood plastic fluidizing column was fabricated, and air fluidization density separation was performed on the size fractions. Air fluidization increased the volume percentage of cenospheres in the carried over fraction anywhere from 10 to 40 volume percent. This was attributed to the presence of very fine fly ash particles, less than 25 microns, in most of the coarser narrow size fractions of fly ash, as contaminated up to 60 volume percent. This very fine fly ash present is much coarser screened and air fluidized carry over fractions are due to difficulty in screening out these fines from fly ash even when using the specialized screening equipment. The very fine particles are presumably agglomerated to each other or too much coarser particles by electrostatic and surface attraction and are retained on much coarser screens instead of passing through.

The screened and air fluidized carry over size fractions were then dispersed in water and centrifuged. This resulted in settling of most of the fine particles (less than 30 micron in size) and the floated portion showed almost 100 volume percent of monosized or very narrow size range cenospheres which could have very high volume. Apparently, the very fine fly ash (less than 30 micron) is mostly solid and has a density greater than 1.0 g/cc. This shows the usefulness of dry screening-dry air fluidization-wet water centrifuging sequence as a measure to get fractions with very high volume percentage of monosized cenospheres.

The screened and air fluidized carry over size fractions were also dispersed in isopropyl alcohol and their particle size distribution was characterized using a laser diffraction Microtracker unit. This showed significant volume fractions of less than 10-25 microns, sometimes less than one micron size fly ash even in supposedly much coarser size fly ash.

The screened and air fluidized carry over size fractions were then screened through a 500 mesh (−25 micron) size Micron Air Jet sieve. The fly ash fraction collected on the screen after the removal of −25 micron fly ash sucked through the screen showed a much higher volume percentage of cenospheres. In particular, the +25 mesh fraction of 45-54 micron air fluidized carry over material showed over 98 volume percentage of monosized cenospheres which have a very high value. This demonstrates that a totally dry three step (i) screening-(ii) air fluidization-(iii) micron jet screening separation process can concentrate up to 98% cenospheres in fractions of fly ash.

B. Results of Screening, Air Fluidized Bed Separation, and Screening Tests

Work detailed above in Section III.D. involved screening of PPPP fly ash in −400 and +400 mesh size fractions followed by short column fluidized bed classification to separate cenospheres. The volume percent of cenospheres increased from five percent in the as collected fly ash to 40% in screened and fluidized bed classified carried over material. It was concluded that it would be beneficial to prescreen fly ash in much narrower size fractions before fluidize bed classification to separate cenospheres in the carried over material in view of their lower density compared to solid fly ash.

In view of this it was decided that the fly ash should be first prescreened into much narrow size fractions and then each narrow size fraction should be separately subjected to classification in taller tapered fluidized bed columns. This approach was expected to result in very high volume percentages of narrow size range cenospheres of fly ash in carried over fractions and leaving very narrow size fractions of solid fly ash microspheres in the bed material. Both the narrow size range low-density cenospheres collected in carry over material, as well as very narrow size high-density solid microspheres can be valuable for various applications. Several organizations market both solid and hollow ceramic microspheres for various applications including fillers and reinforcements in polymers, metals and ceramics.

The as collected PPPP flyash samples were sent out for screening in narrow size fractions. However, each of the narrow size fractions screened had a significant volume fraction of less than 10 micron particles which apparently could not be screened out even though coarser screens, possibly due to agglomeration with each other or with coarser particles as a result of chemical or electrostatic interaction.

When the narrow size fractions were subjected to fluidized bed classification in both short and tall columns, the maximum volume percentages of cenospheres in the carried over materials was less than 40%; part of the reason was that most of the carried over fluidized bed classified fractions between 35-120 micron fractions had large percentages of very fine fly ash less than ten micron size as a contaminant. Microscopy suggested that these ultra fine contaminant particle were solid; centrifuging in water showed that these fine fly ash powders sank to the bottom suggesting that they had a density greater than 1.0 g/cc. The material left floating on water was microscopically examined after drying and it showed close to 100% monosized cenospheres. The water centrifuging demonstrated that the steps of: (a) dry screening into narrow size fractions, (b) air classification of narrow size fractions for density separation to collect lighter particles in carry over sections, and (c) water centrifuging of material carried over during air classification leads to very high percentages above 90% of monosize cenospheres in the material which floated on water.

In further experiments, the carried over fly ash after air classification of narrow size fly ash was screened through a micron jet screen using a 500 mesh screen. This was done to remove the very fine contaminant fly ash particles from carried over material. In one of the selected cases, the material retained on the 500 mesh microinject sieve showed 98% of monosize fly ash cenospheres. This experiment demonstrates that a totally dry process including: (a) screening the fly ash into narrow size fractions, (b) air fluidization of selected size fractions, and (c) screening (using micron jet sieving) of the material carried over during air fluidization can lead to 98% cenospheres in the sized air fluidized-sized fractions of fly ash. Using this sequence and separating narrow-size range cenospheres, the material left behind can have a higher value in certain markets since it will comprise narrow size range solid particles.

The very fine size fractions could be removed from fly ash right at the beginning, and then only the left over material free from fine particles (below 30 microns) could be subjected to screening and air classification to recover material in narrow size fractions containing very high volume percentages (above 90%) of cenospheres.

VI. General Summary of Results

It can be seen that the methods explored herein include screening followed by fluidized bed separation or classification of particles by density. It was concluded that a single step fluidized bed and other classification processes are not likely to lead to separation of cenospheres due to the overlap in size of solid and hollow particles of fly ash, their wide variation in density and their tendency to agglomerate. It appeared advantageous to first do size separation by screening and then do fluidized bed classification. The fluidized bed classification after screening through a 400 mesh screen did increase the percentage of cenospheres in the carried over fly ash.

Transmitted light and reflected light microscopy work, heavy media density separation, centrifugal and settling work were done to quantify the size, weight or volume percentage and density of cenospheres during different separation processes. The water centrifuging or settling process is able to give an indication of weight percentage of cenospheres with density less than one gram per cc. The heavy media separation is able to separate fly ash particles by densities up to 3.0 g/cc. This heavy media work indicated that there are cenospheres with density as high as 2.9 g/cc in fly ash. Up until now cenospheres were considered to include particles with density less than 1.0 g/cc, since they were separated by floating in water.

Screening of fly ash, especially at sizes below 38 microns, may not always be very reliable in separating particles by sizes, possibly due to agglomeration of particles. Advanced techniques of screening, including ultrasonic sifting, may be beneficial to separate finer fractions of fly ash by size.

The advantage of screening fly ash in different narrow size fractions and then doing density separation using processes like fluidized bed is that it can yield both solid and hollow fly ash particles separated in different size ranges. Material can be recovered in narrow size fractions containing very high volume percentages (above 90%) of cenospheres. Both solid and hollow fly ash particles, separated in different size fractions, especially the ultra fine size fractions, can fetch higher prices. Dry mechanical separation processes to separate cenospheres will be much lower in cost as compared to electrostatic, triboelectric, electromagnetic and dielectrophoretic processes.

Results indicated that there were some differences in the size and amount of cenospheres, the bulk density and the color between the fly ash from the front and back hoppers of a coal fired power plant. There are indications that the volume percentage of cenospheres is much greater in fly ash when the fly ash reburn practice is used. It is likely that fly ash generated during the reburning process may also be superior.

Therefore, it can be seen that the invention provides a method for increasing the amount of cenospheres in a fly ash sample. The invention demonstrates that it is possible to obtain cenospheres in a dry state by using air as the "fluid" media for separation. In one version, the invention is a two step process, that is, screen by size followed by density separation such as in a fluidizing vertical column by density. In another version, the separation by density followed by screening by size would also be successful. Additional cycles can improve purity as defined by concentration of cenospheres.

Prior processes did not allow easy cenosphere separation in water without wasting the majority of the remaining fly ash due to rapid hydration characteristics of ASTM C-618 Class C fly ash which is cementitious because of calcium compounds such as CaO. Also, it has been discovered that cenospheres which do not float on water exist and therefore, prior flotation recovery methods have wasted cenospheres. In the invention, cenospheres can be separated in a dry process from high and/or low calcium fly ash. Furthermore, ash reburning methods, such as those disclosed in U.S. Pat. No. 5,992,336, appear to yield higher percentages of cenospheres (10% or higher) in the resulting fly ash.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

INDUSTRIAL APPLICABILITY

This invention relates to a method in which the weight or volume percentage of cenospheres in a fly ash sample is increased preferably providing a material of nearly 100% cenospheres. The recovered cenospheres may be used to produce reinforced polymers, metals, ceramics, and other products.

What is claimed is:

1. A method for identifying particles of different density in a sample of particles using a light microscope, the method comprising:
   providing a sample of particles having particles of at least two different densities;
   spreading the sample of particles on a film of liquid;
   creating an image of the sample of particles with the light microscope; and
   identifying imaged particles floating on the film of liquid, the imaged particles floating on the film of liquid having a lower density than particles not floating on the film of liquid.

2. The method of claim 1 further comprising:
   identifying imaged particles floating on the film of liquid that have a central darkened area, the imaged particles having a central darkened area being hollow particles.

3. The method of claim 2 further comprising:
   counting all imaged particles having a central darkened area to provide a number of hollow particles in the sample;
   counting all particles in the sample to provide a number of all particles in the sample; and
   calculating a ratio of the number of hollow particles to the number of all particles in the sample.

4. The method of claim 1 wherein:
   the sample comprises fly ash particles.

5. The method of claim 1 wherein:
   the step of identifying imaged particles floating on the film of liquid comprises focusing light on a top layer of the film of liquid.

6. The method of claim 1 wherein:
   the step of imaging the sample of particles with a light microscope comprises observing the sample of particles through transmitted light.

7. The method of claim 1 wherein:
   the imaged particles floating on the film of liquid have densities above 1.0 g/cc.

8. The method of claim 1 wherein:
   the particles are fly ash particles, and
   the imaged particles floating on the film of liquid are cenospheres.

9. The method of claim 8 further comprising:
   determining diameters of the fly ash particles and the cenospheres, and
   calculating a volume percentage of cenospheres in the fly ash particles.

10. The method of claim 1 wherein:
the sample consists essentially of fly ash particles.

11. The method of claim 1 wherein:
the image of the sample of particles is created using transmitted optical light.

\* \* \* \* \*